US012627568B2

(12) United States Patent
Spatscheck et al.

(10) Patent No.: US 12,627,568 B2
(45) Date of Patent: May 12, 2026

(54) MOBILE VIRTUAL ENDPOINT ECO-SYSTEM

(71) Applicant: AT&T Intellectual Property I, L.P., Atlanta, GA (US)

(72) Inventors: Oliver Spatscheck, Denison, TX (US); Michael R. Albrecht, Dallas, TX (US); Daniel Flynn, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

(21) Appl. No.: 18/414,699

(22) Filed: Jan. 17, 2024

(65) Prior Publication Data

US 2024/0283706 A1 Aug. 22, 2024

Related U.S. Application Data

(60) Provisional application No. 63/486,388, filed on Feb. 22, 2023.

(51) Int. Cl.
*H04L 41/122* (2022.01)
*H04L 67/10* (2022.01)

(52) U.S. Cl.
CPC ............ *H04L 41/122* (2022.05); *H04L 67/10* (2013.01)

(58) Field of Classification Search
None
See application file for complete search history.

(56) References Cited

U.S. PATENT DOCUMENTS

| | | | | |
|---|---|---|---|---|
| 2019/0387394 | A1* | 12/2019 | Chennupati | ........... H04W 60/00 |
| 2020/0076739 | A1* | 3/2020 | Cox, III | .............. H04L 12/4633 |
| 2020/0382943 | A1* | 12/2020 | Chastain | ............... H04W 12/06 |
| 2021/0344707 | A1* | 11/2021 | Ackerman | .......... H04L 63/1458 |
| 2022/0302993 | A1* | 9/2022 | Hovsepian | ............... H04B 7/10 |
| 2022/0377131 | A1* | 11/2022 | Szilagyi | .............. H04L 41/0894 |
| 2023/0247027 | A1* | 8/2023 | Brar | .................... H04L 63/0272 726/4 |
| 2024/0381227 | A1* | 11/2024 | Zhu | ........................ H04W 40/22 |
| 2024/0422161 | A1* | 12/2024 | Attarwala | ........... H04L 63/0815 |
| 2025/0007783 | A1* | 1/2025 | Smith | ................. H04L 41/0806 |
| 2025/0097147 | A1* | 3/2025 | Raghuvanshi | ........ H04L 45/302 |

* cited by examiner

*Primary Examiner* — June Sison
(74) *Attorney, Agent, or Firm* — Guntin & Gust, PLC; Kenneth S. Kwan

(57) ABSTRACT

Aspects of the subject disclosure may include, for example, obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider. Other embodiments are disclosed.

20 Claims, 9 Drawing Sheets

100

Figure 2A:
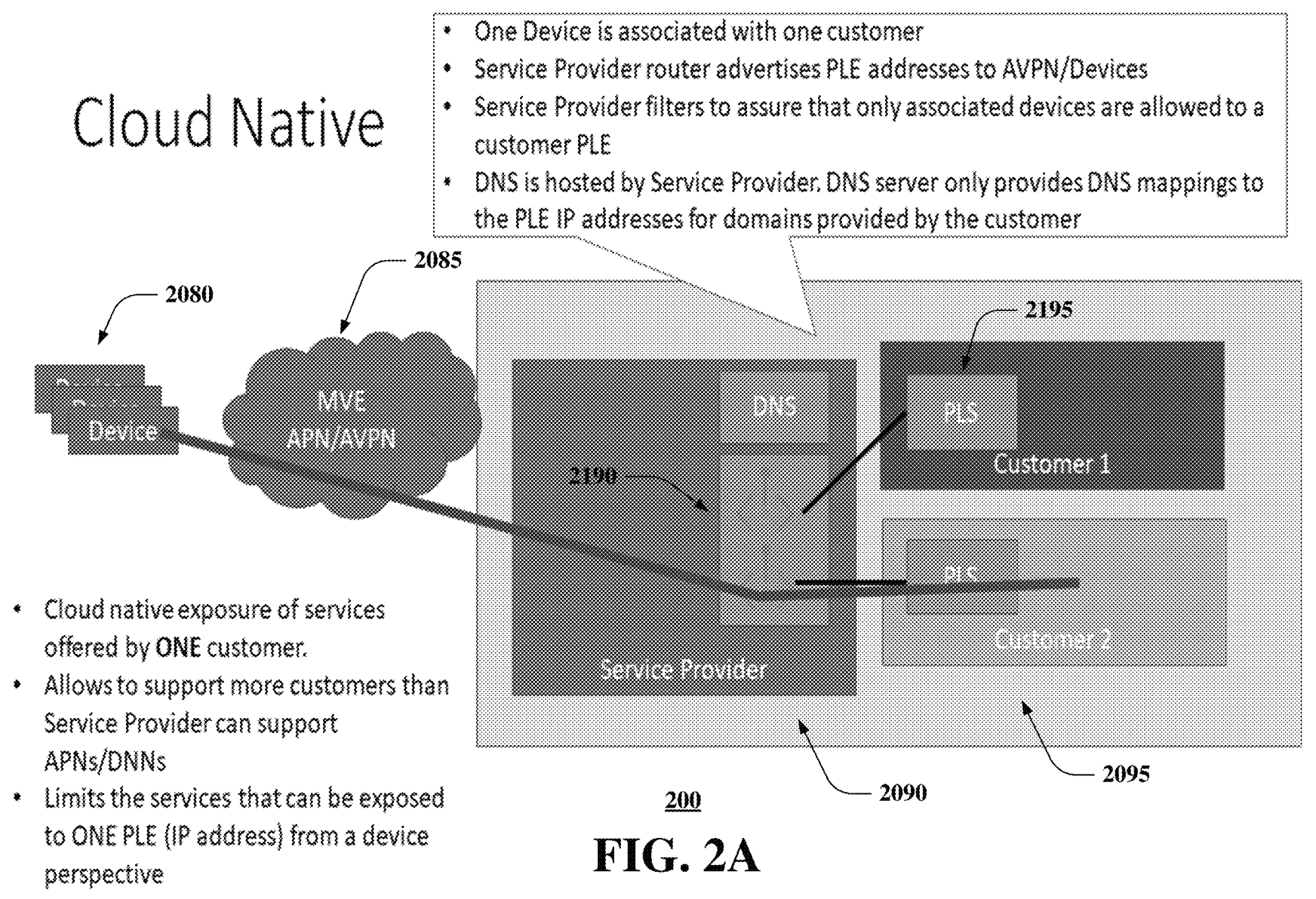

Cloud Native

- One Device is associated with one customer
- Service Provider router advertises PLE addresses to AVPN/Devices
- Service Provider filters to assure that only associated devices are allowed to a customer PLE
- DNS is hosted by Service Provider. DNS server only provides DNS mappings to the PLE IP addresses for domains provided by the customer Device — 2080

MVE APN/AVPN — 2085

Service Provider — 2090

DNS

PLE — 2100

Customer 1

PLE — 2195

Customer 2

PLE

— 2095

- Cloud native exposure of services offered by ONE customer.
- Allows to support more customers than Service Provider can support APNs/DNNs
- Limits the services that can be exposed to ONE PLE (IP address) from a device perspective

Figure 2B:
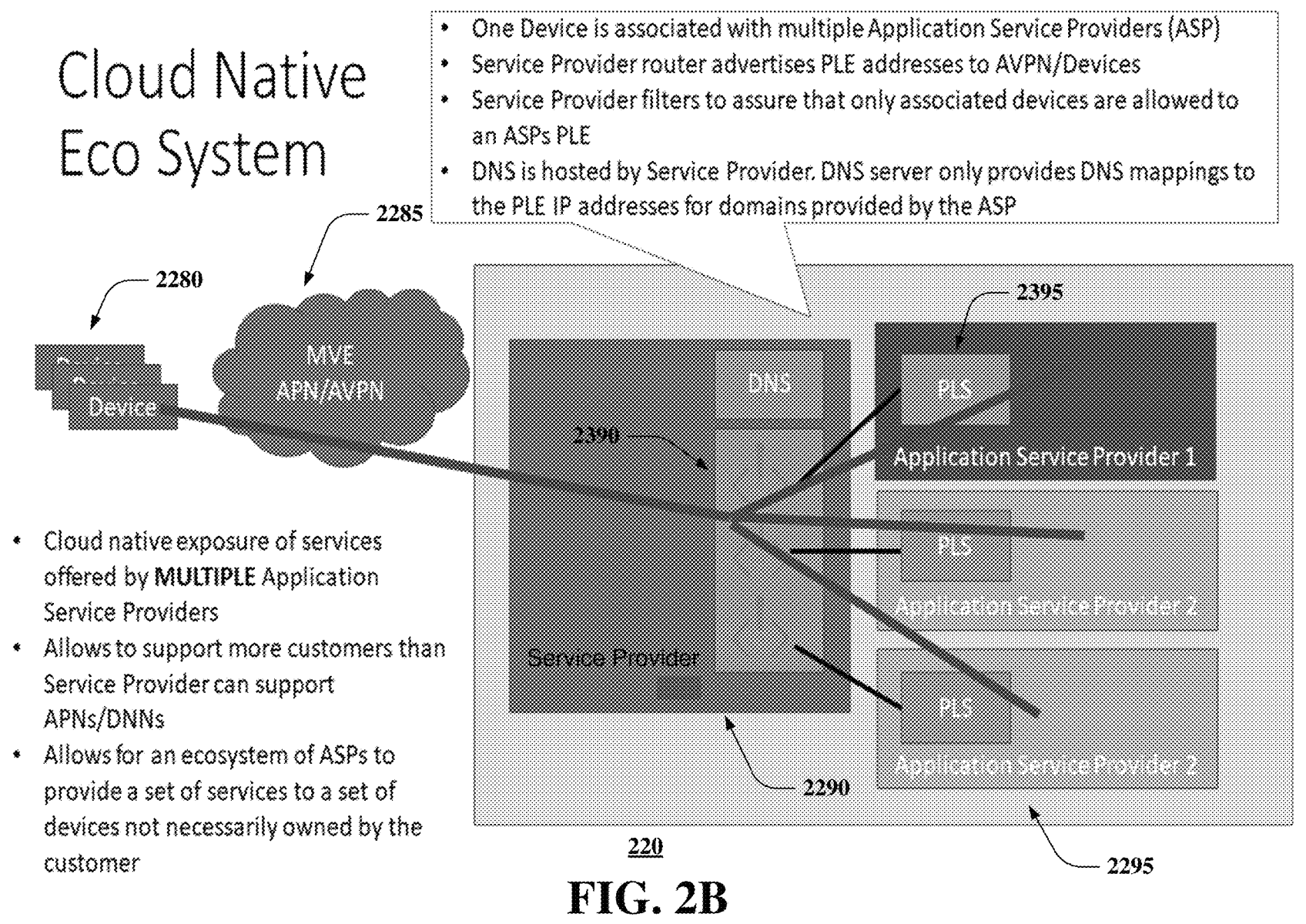

Cloud Native Eco System

- One Device is associated with multiple Application Service Providers (ASP)
- Service Provider router advertises PLE addresses to AVPN/Devices
- Service Provider filters to assure that only associated devices are allowed to an ASPs PLE
- DNS is hosted by Service Provider. DNS server only provides DNS mappings to the PLE IP addresses for domains provided by the ASP Device
2280

MVE
APN/AVPN

2285

Service Provider

DNS

2390

2390

Application Service Provider 1

PLS

2395

PLS

Application Service Provider 2

PLS

Application Service Provider 3

2290

2295

- Cloud native exposure of services offered by MULTIPLE Application Service Providers
- Allows to support more customers than Service Provider can support APNs/DNNs
- Allows for an ecosystem of ASPs to provide a set of services to a set of devices not necessarily owned by the customer

Mobile VNET Endpoints: Deployment Architecture

260

300

600

MOBILE VIRTUAL ENDPOINT ECO-SYSTEM

CROSS REFERENCE TO RELATED APPLICATIONS

This application claims the benefit of priority to U.S. Patent Application Ser. No. 63/486,388 filed on Feb. 22, 2023. All sections of the aforementioned application are incorporated herein by reference in their entirety.

FIELD OF THE DISCLOSURE

The subject disclosure relates to a mobile virtual endpoint eco-system.

BACKGROUND

Users seek secure and reliable communications. Private networks can be built using Multiprotocol Label Switching (MPLS), Virtual Private Network (VPN), Access Point Name (APN), Data Network Name (DNN) and/or Internet Protocol Security (IPSEC) technologies. However, building these private networks is cumbersome, slow, difficult to manage, error prone and generally costly to operate.

BRIEF DESCRIPTION OF THE DRAWINGS

Reference will now be made to the accompanying drawings, which are not necessarily drawn to scale, and wherein:

FIG. 2A is a block diagram illustrating an example, non-limiting embodiment of a system functioning within the communication network of FIG. 1 in accordance with various aspects described herein.

FIG. 2B is a block diagram illustrating an example, non-limiting embodiment of a system functioning within the communication network of FIG. 1 in accordance with various aspects described herein.

DETAILED DESCRIPTION

Figure 1:
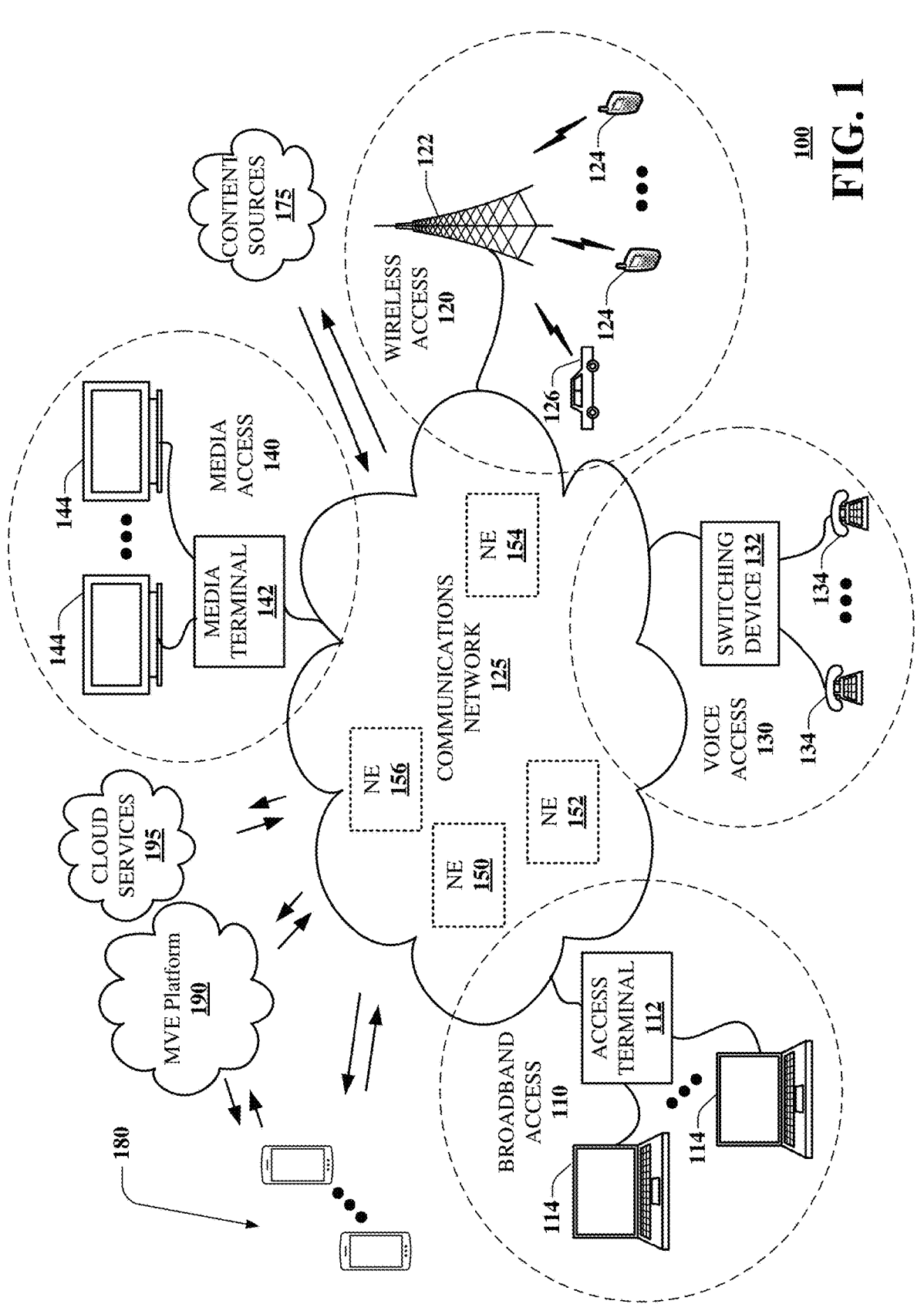
FIG. 1 is a block diagram illustrating an exemplary, non-limiting embodiment of a communications network in accordance with various aspects described herein.

The subject disclosure describes, among other things, illustrative embodiments for managing access to cloud-based services over a private network connection based on identification. As an example, services offered by a cloud provider can be accessed according to identifications such as a list of wireless equipment identifiers (e.g., MSIDSN, IEMI, IMSI, and so forth). The network or communication service provider can then ensure that only such devices can reach the service securely and reliably over a network controlled by the network provider. Other identification techniques can be applied which may or may not be associated with devices, including identification of users that are independent of devices.

In one or more embodiments, commercial services can pair their services with wireless devices/equipment in the field, such as a delivery company ensuring that the tablet the drivers are provided can only reach or access the particular services that the driver needs, which can be done securely, reliably and independent of the state of the Internet. In one or more embodiments, commercial services can have private connections with their customers' wireless device, such as an investment company providing a secure and reliable way of reaching its financial management application on a wireless device independent of DDOS attacks (or other undesired conditions) of their Internet-facing infrastructure. In one or more embodiments, multiple applications could utilize the exemplary embodiments resulting in building an entire eco-system of fine grain secure communication which can change or otherwise influence how the Internet works. In one or more embodiments, device capabilities including UE Route Selection Policy (URSP) can be utilized to facilitate managing access to cloud-based services over a private network connection based on identification.

In one or more embodiments, a cloud-based service can export a service endpoint (e.g., via Microsoft® Azure) and attach a list of wireless equipment identifiers (e.g., MSIDSN, IMSI, IMEI or other identifiers) to the service endpoint. The network communications provider would then be responsible to ensure that only those authorized devices can communicate with the service endpoint exposed by the application service provider (providing the cloud-based service) while maintaining control of the full network path. Various embodiments described herein reference endpoints, such as private and service endpoints, that facilitate cloud-computing services. Other functionality which can be offered by various entities (e.g., Amazon Web Services, Google Cloud Platform, IBM Cloud, Oracle Cloud Infrastructure, VMware Cloud on AWS, Alibaba Cloud, Tencent Cloud, vCloud Air powered by OVH, and so forth) can be employed which allows application service providers to provide cloud-based services including via private network connection over 4G, 5G, 6G, NG networks.

In one or more embodiments, the network communications provider can utilize technologies like APN, DNN, URSP, VPN and/or network slicing for managing access to cloud-based services over a private network connection based on identification (e.g., device and/or users). In one embodiment, the identification list can be attached to the service endpoint using a cloud native configuration to provide a seamless experience for the application service provider(s). In one embodiment, the network communications provider can expose the IMEI (or other appropriate identification information) of the traffic sent to the application service provider using standard protocols, such as the Proxy Protocol v2. In one embodiment, the network communications provider can ensure that communication between the service endpoint and the end user device is secure and reliable using various techniques including: Predictive/AI-based capacity management, end to end network monitoring (e.g., application SLA monitoring), intrusion detection, DDOS detection, and so forth. In one embodiment, the network communications provider can provide APIs which allow the application service provider to instruct the network communications provider to adjust device access, such as automatically removing IMEIs (or other user identification data) from the allowed list if anomalies are detected and/or notifying the application service provider when anomalies are detected.

In one or more embodiments, the techniques described herein can change how secure communication between commercial customers and their cloud-based services is provided, while also allowing for an increase in security and reliability, especially for high value consumer traffic. Other embodiments are described in the subject disclosure.

One or more aspects of the subject disclosure include a system, comprising: a processing system including a processor; and a memory that stores executable instructions that, when executed by the processing system, facilitate performance of operations. The operations include obtaining provisioning information associated with a service provider, where the provisioning information includes a mapping of end user identifications of a group of end users to one or more cloud-based services of the service provider. The operations include identifying an attachment to a network by an end user device utilizing an authentication, authorization, and accounting management function. The operations include obtaining network traffic from the end user device via a private network connection. The operations include determining, according to the provisioning information, that the network traffic is permitted to access a private endpoint of the service provider. The operations include directing the network traffic to the private endpoint based on the determining; and facilitating providing the network traffic to a service endpoint of the service provider.

One or more aspects of the subject disclosure a method comprising: obtaining, by a processing system including a processor, provisioning information associated with a service provider, where the provisioning information includes a mapping of identifications of a group of end user devices to cloud-based services of the service provider. The method includes determining, by the processing system according to the provisioning information, that an end user device of the group of end user devices is permitted to access a service endpoint associated with a particular cloud-based service of the cloud-based services of the service provider. The method includes facilitating, by the processing system, the particular cloud-based service for the end user device utilizing a private network connection, the service endpoint and a private endpoint associated with the service provider.

One or more aspects of the subject disclosure include a non-transitory machine-readable medium, comprising executable instructions that, when executed by a processing system including a processor of a service provider, facilitate performance of operations. The operations include providing provisioning information to equipment of a network provider, the provisioning information including a mapping of identifications associated with a group of end users to one or more cloud-based services of the service provider. The operations include, responsive to a determination by the equipment of the network provider according to the provisioning information that an end user of the group of end users is permitted to access a private endpoint of the service provider, providing, over a private network connection via a service endpoint of the service provider, a particular cloud-based service of the one or more cloud-based services to an end user device of the end user.

Referring now to FIG. 1, a block diagram is shown illustrating an example, non-limiting embodiment of a system 100 in accordance with various aspects described herein. System 100 can include functionality to provide a virtual endpoint system/platform 190 (e.g., a mobile platform) which provides secure and reliable communication between communication devices (e.g., wireless devices) 180 and cloud-based services 195. Platform 190 can be located in various areas of the network, including in a network provider hub. In one embodiment, the platform 190 can connect with a network core (e.g., a Mobility Core) via a VPN and/or a private APN (or DNN in 5G). In one or more embodiments, platform 190 can provide access to cloud-based services for wireless end user devices and/or wired end user devices. In one or more embodiments, platform 190 enables such communication via a private network connection without requiring a build and operation that is cumbersome, slow, difficult to manage, error prone and costly. Platform 190 can be cloud native that allows application layer service providers of the cloud services 195 to use cloud native concepts and APIs to reliably and securely connect to the application(s) on the end user device(s) 180.

In one embodiment, platform 190 can enable a cloud-based service 195 to export an endpoint and attach a list of user identifiers (e.g., wireless equipment identifiers) to the endpoint. The network communications provider can utilize various functionality including APN, DNN, URSP, VPN, and/or network slicing in conjunction with the list to ensure that only those authorized users and/or devices can communicate with the endpoint exposed by the application service provider while maintaining control of the full network path. As an example, the identifier list can be attached to a service endpoint using cloud-native configuration to make it a seamless experience for the application service provider, while the network communication provider exposes the identifier (e.g., an IMEI or other identifier(s)) of the traffic sent to the application service provider using various protocols such as the Proxy Protocol v2. In one embodiment, the platform 190 can utilize private endpoints that include a network interface that uses a private IP address from a virtual network and service endpoints that provide secure and direct connectivity to services, such as using a backbone network. In one embodiment, when a service endpoint is enabled, it can allow private IP addresses to communicate or reach a particular resource type using a public IP of a resource.

For example, system 100 can facilitate in whole or in part obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a system 200 functioning within the communication network of FIG. 1 in accordance with various aspects described herein. System 200 allows for each device to be associated with one of the customers (e.g., cloud-based service providers). In this example, equipment 2090 of a service provider (e.g., a network communications provider's router) can advertise Private Link Endpoint (PLE) addresses to VPN/Devices. The service provider can apply filters (e.g., according to user and/or end user device identifiers) to assure that only associated devices are allowed to access a customer's PLE. The Domain Name System (DNS) can be hosted by the service provider. For instance, the DNS server may only provide DNS mappings to the PLE IP addresses for domains provided by (or otherwise authorized by) the customer (e.g., the cloud-based service provider).

System 200 illustrates the community such as from the customer's view (e.g., the cloud-based service provider's view). In this example, the Cloud provides native exposure of service(s) offered per single customer to the end user devices 2080 (such as tablets that are used by drivers of a delivery company to access a cloud-based delivery tool (e.g., operated by the delivery company) such as maps/schedules/inventory/etc. In one embodiment, system 200 allows supporting more customers than the service provider can support APNs/DNNs. In one embodiment, system 200 can limit the services that can be exposed to one PLE (e.g., IP address) from the device perspective.

In one embodiment, the cloud-based services which are being exposed to devices 2080 are owned by the owner of the service. Only approved devices 2080 are going to be permitted to access the cloud-based services of cloud service providers 2095 and this communication can be properly secured, authenticated and managed via a private network connection 2085, such as through use of an APN/VPN. In one embodiment, system 200 utilizes private networking channeling 2085, so the cloud-based services are not over the Internet.

As an example, system 200 can utilize private endpoints 2190, such as Azure private link endpoints that operate in conjunction with private links service endpoints 2195. In one embodiment, each private link endpoint can have an IP address associated with that PLE. In one embodiment, the private link endpoints 2190 are how application service providers selectively expose services such that they do not expose their entire group of services but rather the particular service(s) that are authorized for the particular user and/or end user device. The security and reliability mapping aspects of the cloud-based service can then be managed by the network communications provider 2090.

In one embodiment, an application service provider can provide a number different types of services and the application service provider (via provisioning of an allowed user/device list) may distinguish the particular devices and/or users that can be permitted to access the services such as some users/devices being capable of accessing some but not all of the cloud-based services while other users/devices can access all of the cloud-based services.

FIG. 2B is a block diagram illustrating an example, non-limiting embodiment of a system 220 functioning within the communication network of FIG. 1 in accordance with various aspects described herein. In one embodiment, system 220 enables each device 2280 to be associated with multiple Application Service Providers 2295 (e.g., cloud-based service providers). The equipment 2290 of the Service Provider (e.g., a router) can advertise PLE addresses (PLEs 2390) to VPN/Devices.

In one embodiment, the Service Provider can apply filters (e.g., the allowed user/device list provisioned to the Service Provider by the application service providers) to assure that only associated users/devices are allowed to access an ASPs PLE 2390. In one embodiment, the DNS is hosted by the Service Provider and the DNS server only provides DNS mappings to the PLE IP addresses for domains provided by (e.g., in the allowed user/device list) the ASP.

In one embodiment, the Cloud provides native exposure of services offered by multiple Application Service Providers 2295. In one embodiment, system 220 allows supporting more customers than the Service Provider can support APNs/DNNs. In one embodiment, system 220 allows for an ecosystem of ASPs to provide a set of services to a set of devices that may or may not be owned by the customer (the cloud-based service provider).

FIG. 2B illustrates a creation of a community of private services. System 220 enables a group of companies to offer services, as well as groups that offer devices. In one embodiment, mappings can be established between device groups (or individual devices) and services even when they are not owned by the same entity. As an example, there can be an application service provider which offers two services, while another application service provider offers a single service. In this example, a device (which is not associated with these application service providers) can access the three cloud-based services as illustrated. Other embodiments can include any number of devices, any number of application services providers and any number of cloud-based services.

In one embodiment, the cloud-based services can have a business relationship with an entity that owns the end user devices. For example, a delivery company may provide employees with tablets and may permit some users to access a first group of cloud-based services while allowing other users to access a second group of cloud-based services. The cloud-based services may have business relationships with the device owner (the delivery company). In this example, system 220 enables a selection of services, a selection of devices, and the application provider(s) can allow certain devices access based on the business relationships they have with the device owners (which in some embodiments can be individual end users rather than employees of a company).

In one embodiment, individual end users can utilize system 220 for obtaining a more secure cloud-based service(s). For example, system 220 enables creation of an environment or eco-system in which a particular company (e.g., a financial service company) exports its fintech service through a private endpoint in conjunction with the network communications provider platform. If the company has its fintech service app on the end user device then that app can reach the fintech service at the fintech service endpoint. This example would utilize an allowed user/device list created by the company and provisioned to the network communications provider that identifies the particular user/device and access can be obtained through a secure link (private network connection) only if the fintech company allows the user/device access. Fintech is just one example of a cloud-based service the exemplary embodiments can provide various types of cloud-based services.

In one embodiment, a company can provide a service via a website on the Internet (which all users can access), as well as selectively providing the same or a similar service via the MVE platform described herein which utilizes a private network connection and authorizes access only to selected users/devices. In this example, undesired conditions associated with the website on the Internet (e.g., a DDOS attack) would not impact those users that are obtaining the service via the private network connection.

In one or more embodiments, UE Route Selection Policy can be utilized to facilitate managing network slice information for the end user device (UE). The URSP can be utilized to enable the end user devices to access the private endpoint of the cloud-based service provider and (if authorized to proceed according to the provisioned allowable user/device list) obtain the cloud-based service. As an example, URSP is a network slice feature which can be enabled by the Polciy Control Function (PCF) which informs the network slice status to the UE via the Access and Mobility Management Function (AMF). One or more of the exemplary embodiments can operate in accordance with and/or utilize one or more functions and/or components described in 3GPP TS 23.503 and 3GPP TS 24.526 standards, the disclosure of which is hereby incorporated by reference herein. One or more of the exemplary embodiments can operate as part of, or in conjunction with, any network including 4G, 5G, 6G, NG networks, which may or may not utilize a PCF to deliver URSP rules to user devices, but which may utilize policy rules (e.g., for control plane functions) to facilitate providing communication services, including providing network slicing, roaming, and/or mobility management.

In one or more embodiments, policy information can be provided such as from a PCF to the end user device(s), which can include URSP that can be used by the end user device to determine how to route outgoing traffic. In one or more embodiments, a URSP rule can include a precedence value of the URSP rule identifying the precedence of the URSP rule among all the existing URSP rules; a traffic descriptor; and one or more route selection descriptors. In one or more embodiments, the traffic descriptor can include either a match-all traffic descriptor; or one or more of the following: one or more application identifiers; one or more IP 3 tuples as defined in 3GPP TS 23.503 (i.e., the destination IP address, the destination port number, and the protocol in use above the IP); one or more non-IP descriptors (i.e., destination information of non-IP traffic); one or more DNNs; one or more connection capabilities; and one or more domain descriptors (i.e., destination FQDN(s) or a regular expression as a domain name matching criteria).

In one or more embodiments, each route selection descriptor can include a precedence value of the route selection descriptor and either: one PDU session type and, optionally, one or more of the following: SSC mode; one or more S-NSSAIs; one or more DNNs; Void; preferred access type; multi-access preference; a time window; and location criteria; or non-seamless non-3GPP offload indication. As an example, an SSC Mode Selection Policy (SSCMSP) can be used by the end user device to associate the matching application with SSC modes. As an example, a Network Slice Selection Policy (NSSP) can be used by the end user device to associate the matching application with SNSSAI. As an example, a DNN Selection Policy can be used by the end user device to associate the matching application with DNN. As an example, a PDU Session Type Policy can be used by the end user device to associate the matching application with a PDU Session Type. As an example, a Non-Seamless Offload Policy can be used by the end user device to determine that the matching application should be non-seamlessly offloaded to non-3GPP access (i.e., outside of a PDU Session). As an example, an Access Type preference can be used such that if the end user device needs to establish a PDU Session for the matching application, this indicates the preferred Access Type (3GPP or non-3GPP or Multi-Access). Other formats can be utilized for the URSP rules which may or may not include some or all of the field described herein and which may or may not include other or additional fields.

In one or more embodiments, the end user device can evaluate the URSP rule(s) in the order of Rule Precedence, such as for every newly detected application. The end user device can determine if the application is matching the Traffic descriptor of any URSP rule. For example, when a URSP rule is determined to be applicable for a given application, the end user device selects a Route Selection Descriptor within this URSP rule in the order of the Route Selection Descriptor Precedence. For example, when a valid Route Selection Descriptor is found, the end user device determines if there is an existing PDU Session that matches all components in the selected Route Selection Descriptor.

Figure 2C:
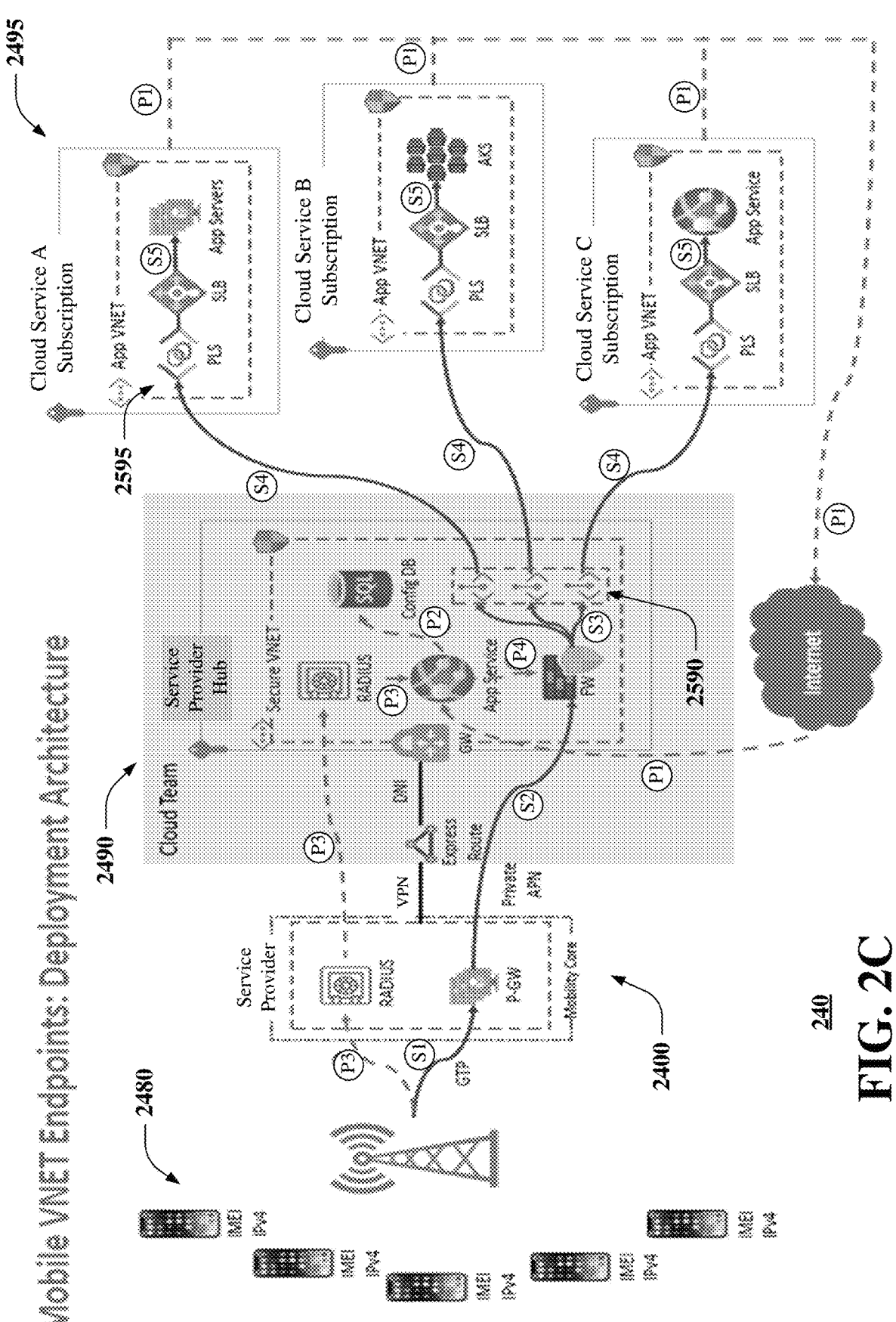
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of a system 240 functioning within the communication network of FIG. 1 in accordance with various aspects described herein. System 240 can include functionality to provide a virtual endpoint system/platform 2490 (e.g., a mobile platform) which provides secure and reliable communication between communication devices (e.g., wireless devices) 2480 and cloud-based services 2495. Platform 2490 can be located in various areas of the network, including in a network provider hub. In one embodiment, the platform 190 can connect with a network core (e.g., a Mobility Core) 2400 via a VPN and/or a private APN (or DNN in 5G). In one or more embodiments, platform 190 can provide access to cloud-based services for wireless end user devices and/or wired end user devices. In one or more embodiments, platform 190 enables such communication via a private network connection. Platform 190 can be cloud native that allows application layer service providers of the cloud services 2495 to use cloud native concepts and APIs to reliably and securely connect to the application(s) on the end user device(s) 2480.

In one embodiment, platform 2490 can enable a cloud-based service 2495 to export an endpoint 2590 and attach a list of user identifiers (e.g., wireless equipment identifiers) to the endpoint. The network communications provider can utilize various functionality including APN, DNN, URSP, VPN, and/or network slicing in conjunction with the list to ensure that only those authorized users and/or devices can communicate with the endpoint exposed by the application service provider while maintaining control of the full network path. As an example, the identifier list can be attached to a service endpoint 2595 using cloud-native configuration to make it a seamless experience for the application service provider, while the network communication provider exposes the identifier (e.g., an IMEI or other identifier(s)) of the traffic sent to the application service provider using various protocols such as the Proxy Protocol v2. In one embodiment, the system 240 through platform 2490 can utilize private endpoints 2590 that include a network interface that uses a private IP address from a virtual network and service endpoints 2595 that provide secure and direct connectivity to services, such as using a backbone network. In one embodiment, when a service endpoint is enabled, it can allow private IP addresses to communicate or reach a particular resource type using a public IP of a resource.

Other features can be employed by system 240 to facilitate providing the cloud-based services via the private network connection to pre-approved users/devices, such as a standard load balancer, app servers, Azure Kubernetes service, cloud service, database (e.g., SQL), gateways, P-Gateways, firewalls, and so forth.

As an example, system 240 enables a provisioning process or flow which is represented by P1-P4 where various application service providers can provision their cloud-based services. For example, the provisioning at P1 can include providing (e.g. via the Internet, via an API or utilizing other delivery techniques) various information to the platform 2490 (e.g., the network communications provider hub) such as a private link service ID, a DNS name corresponding to the cloud-based service, a list of devices and/or users that are to be granted access to the cloud-based service (e.g. via the private and service endpoints). In one embodiment, the cloud-based service provider can be provided the ability to deregister devices, deregister users, and/or deregister services. In one embodiment, a group of APIs can be established for implementing (and modifying the configuration of) the provisioning of the service for P1.

At P2, the configuration or provisioning can be stored locally, such as at a database (e.g., SQL or other type of database). At P3, end user devices may come on to the network and RADIUS can be applied for authentication and accounting flows to indicate that a particular device is attached or that the device is attached from the mobile network. In one embodiment, RADIUS allows tracking so that platform 2490 can authorize access for the device at P4 and can associate the device to the correct private endpoint 2590 so that traffic can be appropriately directed to the service endpoint 2595.

As an example, system 240 enables a call/service process or flow which is represented by S1-S5 where various application service providers can provision their cloud-based services. When an end user device 2480 attempts to access a cloud-based service (e.g., the device opened an app or the device opened its browser to access a URL) the device's traffic will be directed to the P-Gateway at S1, which will then send it across the private network connection to the platform 2490 at the network communications provider's hub at S2. The platform 2490 will then resolve the communications (which can include passing through a firewall) so as to direct the traffic to the private endpoint at S3. This can include analyzing the allowed user/device list (or other provisioning information) and if access is authorized to the private endpoint 2590 then at S4 the traffic can be provided to the service endpoint 2595. In one embodiment, load balancing can be performed and the traffic can be provided at S5 for implementing the cloud-based service (e.g., via App servers, App Service, Azure Kubernetes Service (AKS), Elastic Kubernetes Service (EKS), Elastic Container Service (ECS), and so forth).

In one embodiment, the circuit between the mobility core and the cloud is a VPN network. For example, a private APN can be used to map the traffic coming into the IP gateway to the correct VPN. In one embodiment, different circumstances, conditions or situations can warrant use of different APNs such that there can be APNs for other uses on the mobile network. In one embodiment, the system 240 can utilize a particular APN for enabling access to the cloud-based service. In one embodiment, the APN is a logical network, whereas the VPN and the DNI operate as a physical connection. In another embodiment, system 240 applies to 5G, 6G and NG networks, such as utilizing a DNN rather than an APN.

In one or more embodiments at S1 and S2, various safeguards, security measures and management schemes can be implemented to further enhance system 240 such as predictive capacity planning, intrusion detection, suppression of rogue devices, and so forth. These procedures ensure that the traffic which reaches endpoints 2590 are not only from approved/allowed users/device but also that the traffic fits expected traffic profiles.

In one embodiment, the allowed list provisioned to the network service provider can be based on any identifier (or combination of identifiers) of the device and/or user that is visible to the network of the network communications provider including identifiers that are associated with a user and independent of end user device seeking access to the cloud-based service, including billing records of the user.

In one embodiment a first API call is utilized for creation, updating and deletion of the private endpoint and then a second API call can be utilized to attach and remove subscribers and/or devices. In one embodiment, the provisioning can be via the Internet. In another embodiment, the provisioning can be via cloud portals.

Figure 2D:
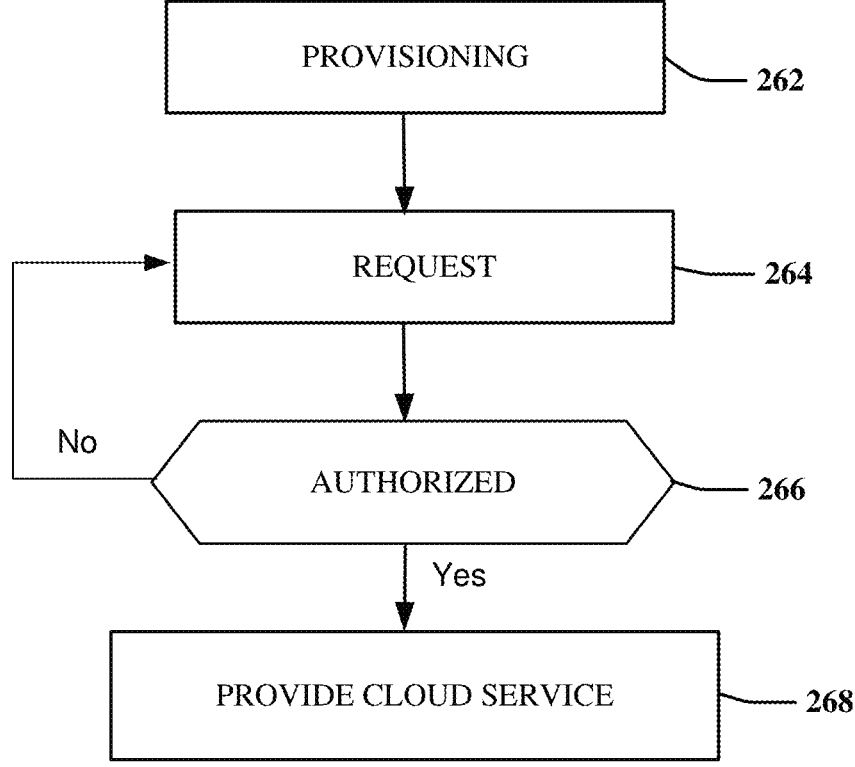
FIG. 2D depicts an illustrative embodiment of a method in accordance with various aspects described herein.

FIG. 2D depicts an illustrative embodiment of a method 260 in accordance with various aspects described herein. At 262, provisioning information associated with a service provider can be obtained where the provisioning information includes a mapping of identifications (e.g., for users and/or for a group of end user devices) to cloud-based services of the service provider. The provisioning can be done in a number of different ways including via APIs between the cloud-based service providers and the MVE platform. In one embodiment, the provisioning can be done in conjunction with a registration process for the end user devices and/or end users. For instance, where the end user devices are owned by the cloud-based service provider (e.g., a delivery company that provides tablets to its drivers), the registration can be done in bulk. In other embodiments, cloud portals can be utilized for registration. As an example, based on the registration, a list of allowed devices and/or allowed users can be generated.

At 264, an end user device can attempt to access a cloud-based service, such as via opening of an app or utilizing a browser to visit a URL. At 266, a determination can be made, according to the provisioning information, whether the end user device is permitted to access a service endpoint associated with a particular cloud-based service of the cloud-based services of the service provider. If permission is granted then at 268 the particular cloud-based service can be provided to the end user device utilizing a private network connection, the service endpoint and a private endpoint associated with the service provider.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, one or more of the end user devices can be associated (e.g., owned by) with the particular service provider and/or one or more of the end user devices may not be associated (e.g., not owned by) with the particular service provider.

In one or more embodiments, one or more of the end user devices may be provided to some of the cloud-based services while not being provided access to other cloud-based services of the same or different cloud-based service providers, such as allowing supervisors to access HR management services and delivery services (via the private network connection) while limiting drivers to accessing delivery services (via the private network connection).

Figure 3:
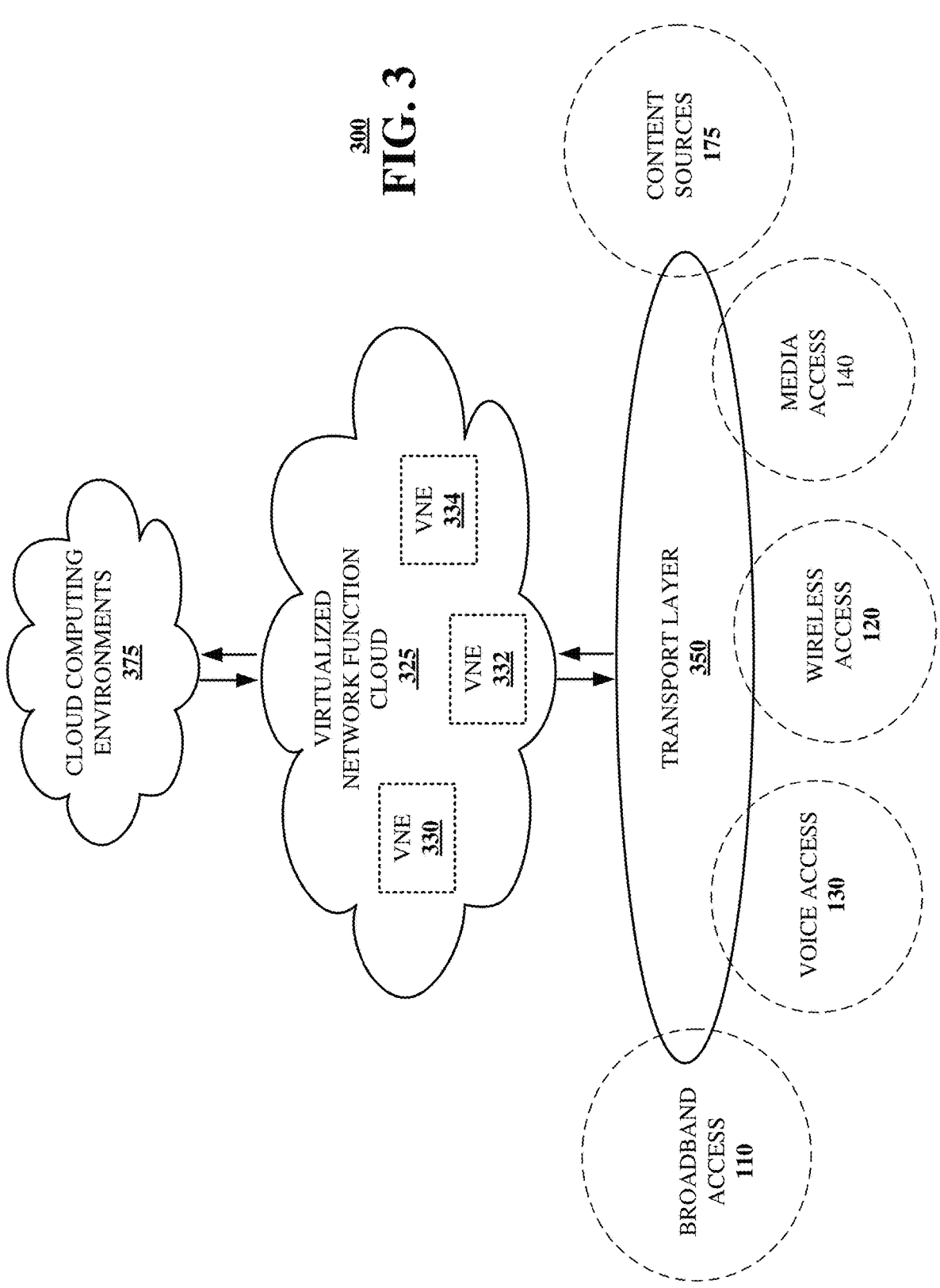
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 260 presented in FIGS. 1, 2A, 2B, 2C, and 2D. For example, virtualized communication network 300 can facilitate in whole or in part obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
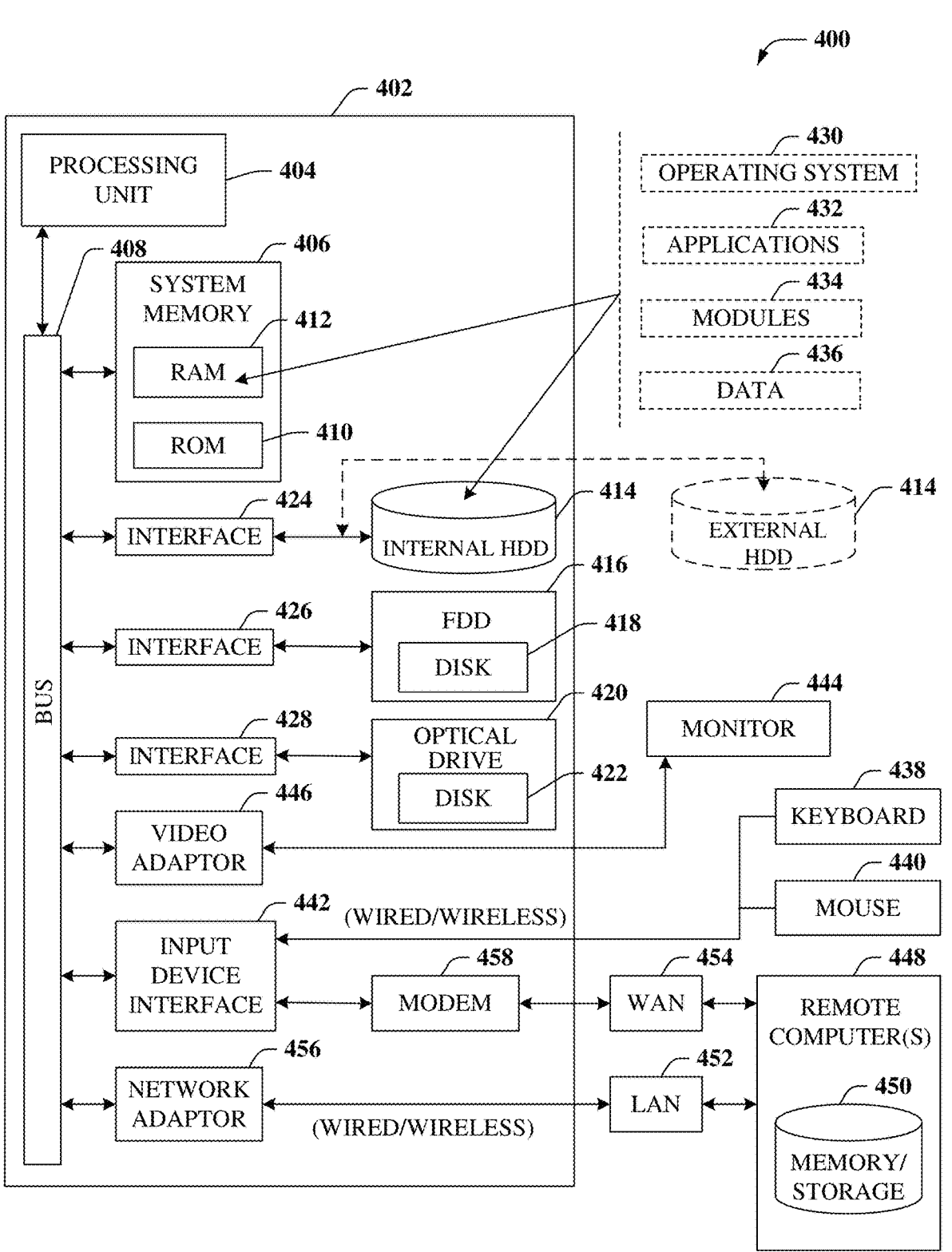
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
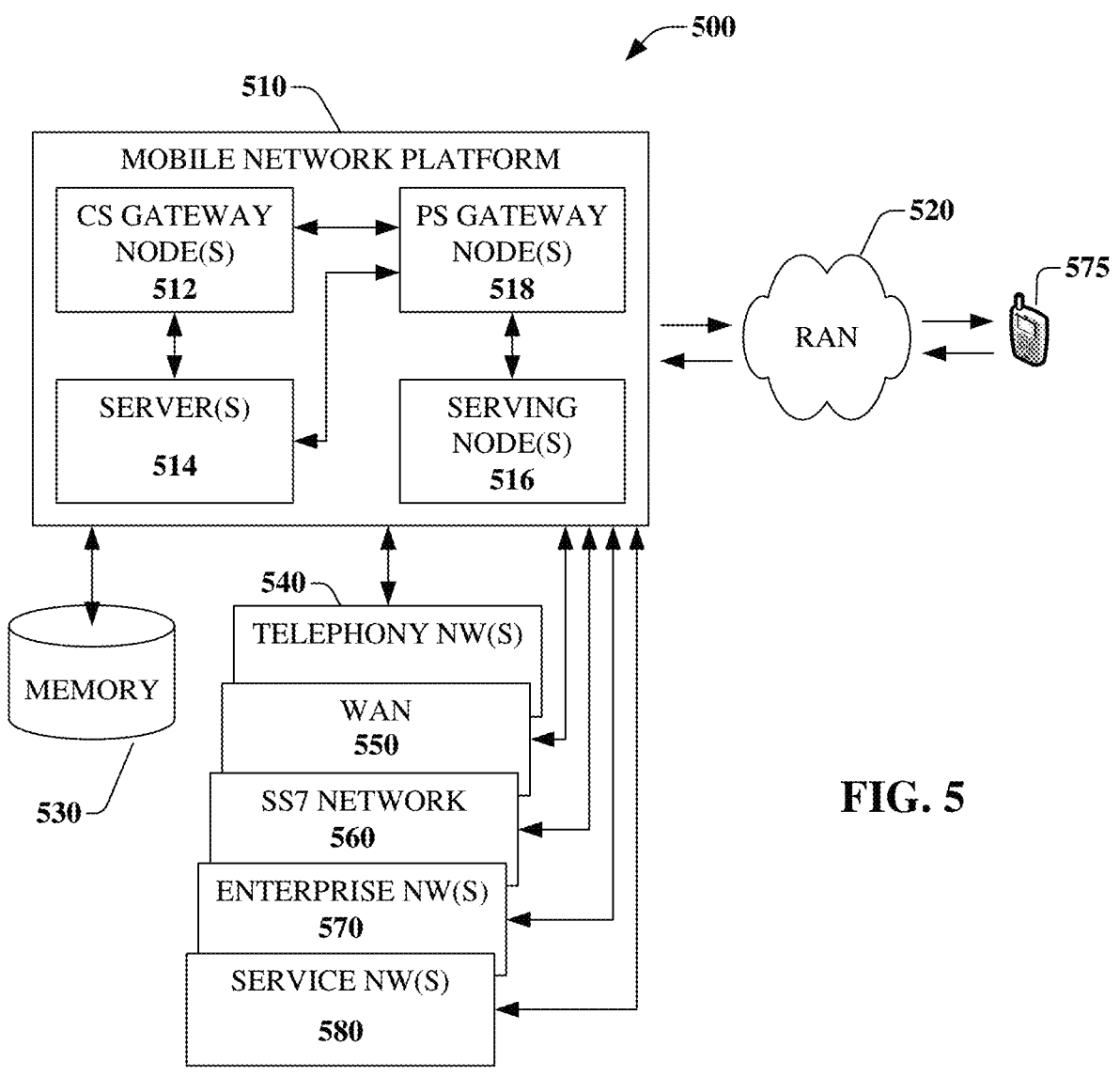
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network

560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
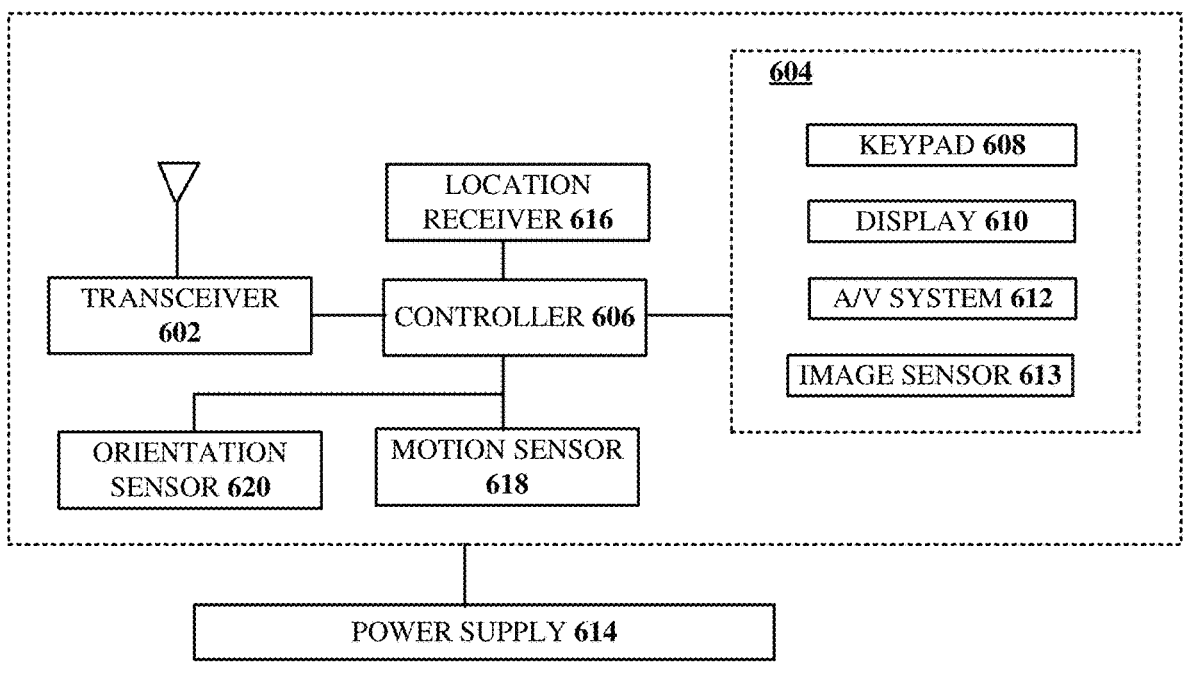
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining provisioning information associated with a service provider where the provisioning information includes a mapping of identifications of a group of end user devices to cloud-based services of the service provider; determining, according to the provisioning information, that an end user device of the group of end user devices is permitted to access a service endpoint associated with a particular cloud-based service of the cloud-based services of the service provider; and facilitating the particular cloud-based service for the end user device utilizing a private network connection, the service endpoint and a private endpoint associated with the service provider.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 . . . x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:

a processing system including a processor; and a memory that stores executable instructions that, when executed by the processing system, facilitate performance of operations, the operations comprising:

obtaining provisioning information associated with a service provider, the provisioning information including a mapping of end user identifications of a group of end users to cloud-based services of the service provider;

obtaining, from a gateway of a mobile core network via a private network connection with the gateway of the mobile core network, network traffic transmitted by an end user device;

determining, according to the provisioning information, that the network traffic is permitted to access a private endpoint of the service provider;

directing the network traffic to the private endpoint based on the determining; and facilitating providing the network traffic to a service endpoint of the service provider, wherein a first cloud-based service of the service provider corresponding to the service endpoint exports the private endpoint to the processing system and attaches, to the private endpoint, a listing of end user device identifiers for inclusion in the mapping of end user identifications, and a second cloud-based service of the service provider corresponding to another service endpoint of the service provider exports another private endpoint to the processing system and attaches, to the other private endpoint, another listing of end user device identifiers for inclusion in the mapping of end user identifications, thereby facilitating differentiated end user device access to different cloud-based services of the service provider.

2. The system of claim 1, wherein the end user identifications include device identifiers, and wherein the provisioning information includes a private link service identification and one or more DNS names corresponding to the cloud-based services.

3. The system of claim 1, wherein the obtaining the provisioning information is via an application programming interface, and wherein the operations further comprise identifying an attachment to a network by the end user device utilizing an authentication, authorization, and accounting management function.

4. The system of claim 1, wherein the operations further comprise storing the provisioning information in a database.

5. The system of claim 1, wherein the operations further comprise performing predictive capacity management.

6. The system of claim 1, wherein the operations further comprise performing end to end network monitoring including application Service Level Agreement monitoring.

7. The system of claim 1, wherein the operations further comprise performing intrusion detection, DDOS detection or a combination thereof.

8. The system of claim 1, wherein the operations further comprise providing an application programming interface that enables the service provider to automatically remove an end user device from an allowed list responsive to an anomaly being detected.

9. The system of claim 1, wherein the obtaining the network traffic is based at least in part on a UE Route Selection Policy.

10. A method comprising:

obtaining, by a processing system including a processor, provisioning information associated with a service provider, the provisioning information including a mapping of identifications of a group of end user devices to cloud-based services of the service provider;

determining, by the processing system according to the provisioning information, that an end user device of the group of end user devices is permitted to access a service endpoint associated with a particular cloud-based service of the cloud-based services of the service provider; and facilitating, by the processing system, the particular cloud-based service for the end user device utilizing a private network connection, the service endpoint and a private endpoint associated with the service provider, wherein the private network connection interconnects the processing system with a gateway of a mobile core network of a network provider, wherein network traffic from the end user device relating to the particular cloud-based service is received by the processing system from the gateway of the mobile core network via the private network connection, and wherein the particular cloud-based service of the service provider exports the private endpoint to the processing system and attaches, to the private endpoint, a listing of end user device identifiers for inclusion in the mapping of identifications, and another cloud-based service of the service provider corresponding to another service endpoint exports another private endpoint to the processing system and attaches, to the other private endpoint, another listing of end user device identifiers for inclusion in the mapping of identifications, thereby facilitating differentiated end user device access to different cloud-based services of the service provider.

11. The method of claim 10, wherein the group of end user devices are equipment of the service provider.

12. The method of claim 10, further comprising:

determining, according to the provisioning information, that the end user device is not permitted to access a second service endpoint associated with a second cloud-based service of the cloud-based services of the service provider; and prohibiting, by the processing system, the end user device from accessing a second private endpoint associated with the second cloud-based service of the service provider.

13. The method of claim 10, further comprising:

determining, according to other provisioning information associated with a second service provider, that the end user device is permitted to access a particular service endpoint associated with a cloud-based service of the second service provider; and facilitating, by the processing system, the cloud-based service of the second service provider for the end user device utilizing the private network connection, the particular service endpoint and a particular private endpoint associated with the second service provider.

14. The method of claim 10, wherein the identifications include an MSISDN, IMEI, an IMSI, or a combination thereof, and wherein the provisioning information includes a private link service identification and one or more DNS names corresponding to the cloud-based services.

15. The method of claim 10, wherein the obtaining the provisioning information is via an application programming interface.

16. The method of claim 10, further comprising storing the provisioning information in a database.

17. The method of claim 10, further comprising performing predictive capacity management, Service Level Agreement monitoring, intrusion detection, DDOS detection, or a combination thereof.

18. The method of claim 10, wherein the facilitating the particular cloud-based service is based at least in part on UE Route Selection Policy.

19. A non-transitory machine-readable medium, comprising executable instructions that, when executed by a processing system including a processor of a service provider, facilitate performance of operations, the operations comprising:

providing provisioning information to equipment of a network provider, the provisioning information including a mapping of identifications associated with a group of end users to cloud-based services of the service provider; and responsive to a determination by the equipment of the network provider according to the provisioning information that an end user of the group of end users is permitted to access a private endpoint of the service provider, providing, over a private network connection via a service endpoint of the service provider, a particular cloud-based service of the service provider to an end user device of the end user, wherein a second private network connection interconnects a gateway of a mobile core network of the network provider with the equipment of the network provider, wherein network traffic from the end user device relating to the particular cloud-based service is received by the equipment of the network provider from the gateway of the mobile core network via the second private network connection, and wherein the particular cloud-based service of the service provider exports the private endpoint to the equipment of the network provider and attaches, to the private endpoint, a listing of end user device identifiers for inclusion in the mapping of identifications, and another cloud-based service of the service provider corresponding to another service endpoint of the service provider exports another private endpoint to the equipment of the network provider and attaches, to the other private endpoint, another listing of end user device identifiers for inclusion in the mapping of identifications, thereby facilitating differentiated end user device access to different cloud-based services of the service provider.

20. The non-transitory machine-readable medium of claim 19, wherein the operations further comprise removing a particular end user from an allowed list associated with the provisioning information responsive to an anomaly being detected.

* * * * *